United States Patent [19]
Solheim et al.

[11] Patent Number: 5,896,391
[45] Date of Patent: Apr. 20, 1999

[54] FORWARD ERROR CORRECTION ASSISTED RECEIVER OPTIMIZATION

[75] Inventors: Alan Glen Solheim, Kanata, Canada; Kim Byron Roberts, Welwyn Garden City, United Kingdom

[73] Assignee: Northern Telecom Limited, Montreal, Canada

[21] Appl. No.: 08/769,312

[22] Filed: Dec. 19, 1996

[51] Int. Cl.$^6$ .................................................. G06F 11/00
[52] U.S. Cl. ............................................. 371/5.1; 371/35
[58] Field of Search ............................ 371/5.1, 5.2, 30, 371/35; 375/214

[56] References Cited

U.S. PATENT DOCUMENTS

| | | | |
|---|---|---|---|
| 4,097,697 | 6/1978 | Harman | 371/5.1 |
| 4,799,790 | 1/1989 | Tsukamoto | 356/73.1 |
| 4,823,360 | 4/1989 | Tremblay et al. | 375/214 |
| 5,418,789 | 5/1995 | Gersbach et al. | 371/5.2 |

*Primary Examiner*—Phung M. Chung
*Attorney, Agent, or Firm*—Foley & Lardner

[57] ABSTRACT

A method for recovering an outgoing data signal from an incoming signal received over a transmission network. The method provides for preparing a bit error rate (BER) map for a data regenerator, determining, on the BER map, an optimal operation point for a provisioned $BER_{prov}$ value, and monitoring the data regenerator to function in the optimal operation point for providing a regenerated data signal. In addition, the errors in the regenerated data signal may be further corrected using current forward error correction circuitry. To prepare a BER map, the data regenerator operates in an error mapping mode, wherein the incoming signal is decoded using a slicing level $V_i$ and a phase shifted clock signal $CL_j$. Each value $BER_{i,j}$ is measured over a preset period of time $T_{prov}$ for a pair $V_i$, $\phi_j$ and stored in a memory. The BER maps may be prepared once a day or at any other suitable interval. In the optimization mode, the operation point for the regenerator is calculated for a BER contour corresponding to the provisioned $BER_{prov}$, for determining the coordinates $V_{opt}$ and $\phi_{opt}$. In the data regeneration mode, the regenerated data signal is obtained using $V_{opt}$ and $\phi_{opt}$.

16 Claims, 5 Drawing Sheets

ND OF THE INVENTION

1. Field of the Invention

This invention relates to regeneration of binary data signals and more specifically to a forward error correction (FEC) assisted receiver optimization.

2. Background Art

It is well known that signals suffer degradation between the transmitter and receiver from sources related to sampling and quantizing effects, and channel effects.

The sampling and quantizing effects comprise the distortion inherent in quantization, which could be a round-off or truncation error, errors introduced by the quantizer saturation, and timing jitters. Generally, saturation may be avoided by using automatic gain control (AGC), which extends the operating range of the quantizer. Jitters are any deviation of the sample of the input signal from its designated position, and its effect is equivalent to a frequency modulation. Timing jitter is generally controlled with very good power supply isolation and stable clock references.

The corruption introduced by the channel is due to such factors as noise, inter-symbol interference, dispersion, etc. The degradation of the recovered signal quality with the channel induced errors is called "threshold effect".

If the channel noise is small, there will be no problem detecting the presence of a waveform, the only errors present in the reconstruction being the sampling and quantizing noise. On the other hand, if the channel noise is large, the resultant detection errors cause reconstruction errors. Thermal noise, interference from other users, and interference from circuit switching transients can cause errors in detecting the pulses carrying the digitized samples.

Intersymbol interference is due to the bandwidth of the channel. A band-limited channel spreads the pulses, and if the width of the pulse exceeds a symbol duration, overlap with neighbouring pulses may occur.

Dispersion is the chromatic or wavelength dependence of a parameter, as for example the distortion caused by different wavelengths of light within the pulse, travelling at different speeds. The pulse distortion in a fiber optic system may, for example, be caused by some parts of the light pulses following longer paths (modes) than other parts.

The degradation of a signal is expressed in BER (bit error rate) which is the ratio between the number of erroneous bits counted at a site of interest over the total number of bits received.

In the last decade, transmission rates of data signals have increased very fast. For high rate transmission, such as at 10 or 40 Gb/s, signal corruption introduced by the transmission channel is a critical parameter. The demand for receivers with high sensitivity increased progressively with the transmission rates. The receiver's task is to decide which symbol was actually transmitted. For a given BER, the system performance is dependent upon the decision level, defined also as threshold level or as a slicing level, which is used for data regeneration. For example, a threshold level variation of only 8% can result in a variation of the receiver sensitivity of up to about 1 dB. Detection errors may develop as a result of an incorrect decision level or incorrect clock/data timing being selected.

Current optical receivers comprise an avalanche photo-diode (APD), or a high performance PIN photodiode, coupled to a transimpedance amplifier. The transimpedance amplifier is a shunt feedback amplifier acting as a current-to-voltage transducer. The signal is then amplified and a data regenerator extracts the information from the amplified signal. Generally, binary data regenerators are provided with a fixed threshold level selected such as to provide the best error rate at a predetermined signal power level. However, a fixed threshold cannot account for the effects of aging of the components, temperature variations, etc. As a result, higher power levels need to be transmitted to account for the above factors, which in turn diminish the length of the transmission channel.

As the requirement for essentially error free operation for fiber systems became more stringent, systems which allowed errors to occur during the normal data regeneration mode of operation are currently less acceptable. Driven by customer demand, sophisticated performance monitors are provided at the receiver site, which perform optimization routines for lowering the BER of the recovered signal.

It is known to generate a control code at the transmission site which is then transmitted with the information along the communication link. Error detection is based in general on comparison between the transmitted and the received control code. Error correction is based on various algorithms which compensate for the specific error detected in the control code. This method is known as forward error correction (FEC).

A data regenerator including a performance monitor is disclosed in U.S. Pat. No. 4,097,697 (Harman, issued on Jun. 27, 1978 and assigned to Northern Telecom Limited). This patent discloses a first differential amplifier which regenerates the data signal by comparing the incoming signal with a fixed threshold. A second differential amplifier compares the incoming signal with an offset slicing level to produce an error-ed regenerated signal. Both differential amplifiers are clocked by the recovered clock signal. The regenerated signals are compared to each other and the result is used to determine the degradation of the incoming signal.

U.S. Pat. No. 4,799,790 (Tsukamoto et al., issued Jan. 24, 1989 and assigned to Anritsu Corporation) discloses a device comprising a transmitter for launching signals of various wavelengths into a reference or test fiber, and a receiver. At the receiver, the phase difference between two adjacent wavelengths is measured for both the reference and test path for determining the delay of the respective wavelength.

None of the above patents is concerned, however, with providing a simple device and method for detecting and correcting errors in the recovered signal which uses the information in the data path itself. The receiver circuits described in the above patents rely on duplicate channels and pseudo-error detection. The prior art error detecting circuits must be located at the receiver site, which results in a reduced flexibility of the system architecture.

The extent of signal degradations may be directly measured using an eye closure diagram, which is the graphic pattern produced on an oscilloscope when a baseband signal is applied to the vertical input of the oscilloscope and the symbol rate triggers the instrument time base. For a binary signal, such an eye diagram has a single eye which is open or closed to an extent determined by the signal degradation. An open pattern is desired. Changes in the eye size indicate intersymbol interference, amplitude irregularities, or timing problems.

U.S. Pat. No. 4,823,360 (Tremblay et al., issued Apr.; 18, 1989 and assigned to Northern Telecom Limited) discloses a device for measuring chromatic dispersion of an optical fiber based on a baseband phase comparison method, using the eye closure diagram of the signal received over the transmission link. The device described in this U.S. patent evaluates the transmission link performance using three threshold levels for recovering data. Two of the thresholds are obtained by measuring on the eye diagram the level of "long 0s" and "long 1s", respectively, for a preset error rate, and the third threshold is provided in a selected relationship to the other two to produce regenerated signals.

The technique described in the '360 patent is based on generating "pseudo-errors" on separate pseudo-error channels. The pseudo-errors give some idea of how error performance varies with the slicing level and, because they do not appear on the in-service transmission path, they do not affect service. Consequently, this technique can be used for dynamic control of in-service systems. Unfortunately, the separate pseudo-channels require additional high speed circuitry, and the pseudo-errors may not give a true reflection of error performance.

SUMMARY OF THE INVENTION

It is an object of the present invention to provide a receiver with means for detection and correction of errors which overcomes totally or in part the deficiencies of the prior art receivers.

It is another object of this invention to provide a smart receiver design, the receiver optimization being based on the errors detected in the signal received over the transmission channel.

It is still another object of the invention to provide a method for detection and correction of errors which can be used during regular data transmission.

Accordingly, the invention is directed to a method for recovering an outgoing data signal from an incoming signal received over a transmission network comprising the steps of preparing a bit error rate (BER) map for a data regenerator; determining, on the BER map, an optimal operation point for a provisioned $BER_{prov}$ value; and monitoring the data regenerator to function in the optimal operation point for providing a regenerated data signal.

According to a another aspect, the invention further includes a data regenerator for recovering an outgoing data signal from an incoming signal received over a transmission network comprising a comparator for receiving the incoming signal and a slicing level and providing a digital signal; a phase shifter for shifting a regenerated clock signal with a phase signal to obtain a phase shifted clock signal; a latch for receiving the digital signal and the phase shifted clock signal to provide a regenerated data signal; error detection means for determining a raw bit error rate (BER) of the regenerated data signal; a control circuit for generating the slicing level and the phase signal; and a memory for storing a BER map.

Advantageously, the circuit and method of the invention provides a simplified design for a high speed decision circuit which delivers a substantially error-free output, despite the fact that there are errors occurring on the data channel.

Another advantage of the invention is that it utilizes the information in the data path itself, thereby eliminating the high speed circuitry associated with a separate monitoring channel, and consequently the possibility of errors depreciating the quality of the data channel from a monitor channel.

Still another advantage of the invention is that it uses a programmable error threshold, obtained by mapping of very low BER contours. This results in increased system flexibility. In addition, the invention allows receiver optimization at intermediate regenerator sites where only the error detection circuitry may be available. In SONET systems, for example, receiver optimization can be performed by utilizing existing error detection circuitry for section and line BIP8, without the forward error correction circuitry at that site. This permits integration of the FEC circuit at the tributaries, if desired.

BRIEF DESCRIPTION OF THE DRAWINGS

The foregoing and other objects, features and advantages of the invention will be apparent from the following more particular description of the preferred embodiments, as illustrated in the appended drawings, where.

DESCRIPTION OF THE PREFERRED EMBODIMENT

Figure 1:
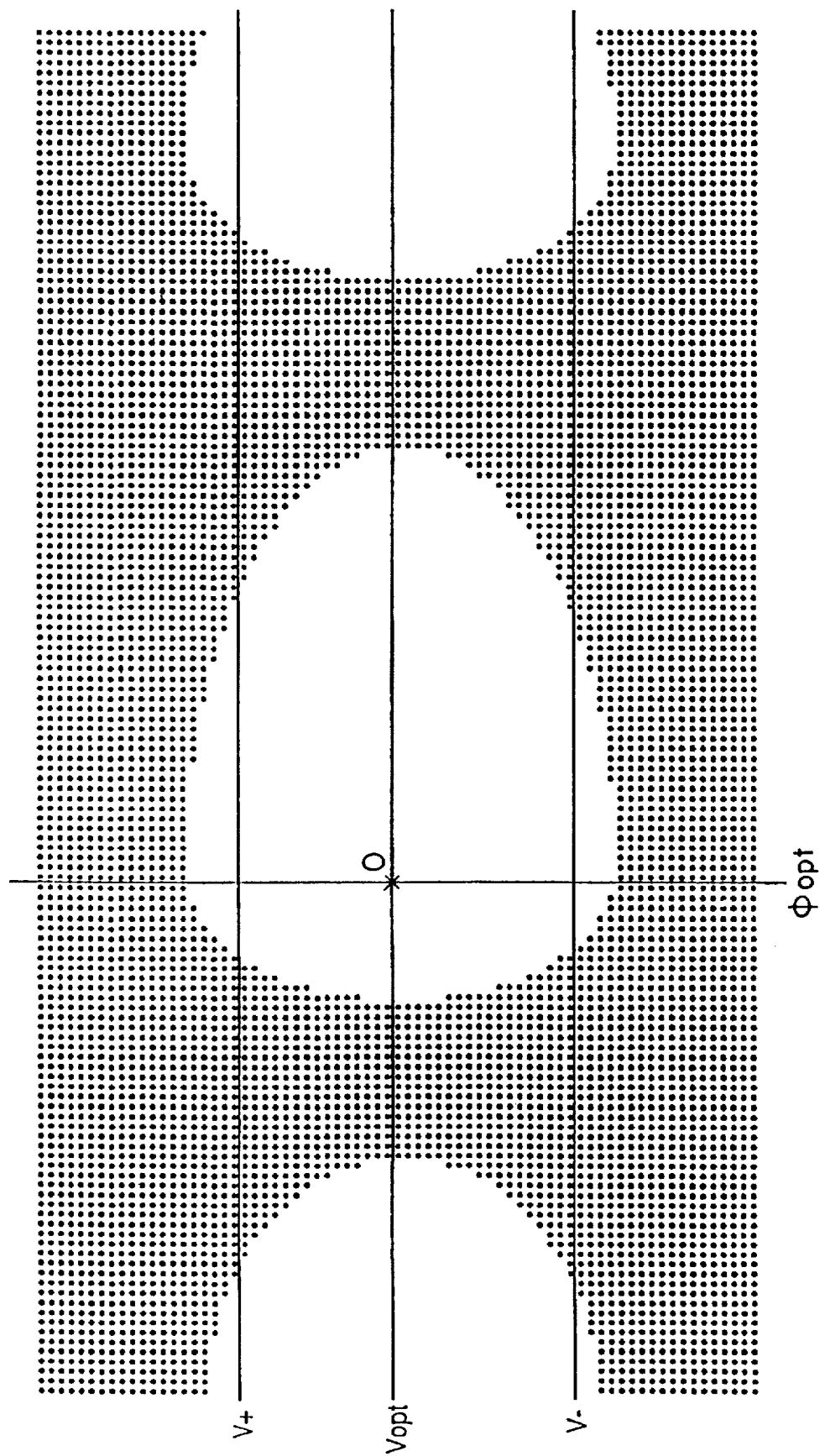
FIG. 1 illustrates an eye closure diagram of a digital signal.

FIG. 1 is an eye closure diagram illustrating the parameters used for regeneration of the information received over a transmission link. The vertical coordinate of the eye closure diagram represents the amplitude of the data-in signal, and the horizontal coordinate represents time. $V_+$, $V_-$ are voltage levels (powers) associated with the lowest inner upper level and the highest inner lower level of the data-in signal.

The operation point of the data regenerator according to this invention has the coordinates $\phi_{opt}$ and $V_{opt}$. The optimum sampling phase $\phi_{opt}$ provides the best phase margin to accommodate phase jitter at an acceptable $BER_{prov}$ for the respective transmission system. The optimum slicing level $V_{opt}$ is the level used for deciding if the level of the incoming signal represents a logic "1" or "0" for $BER_{prov}$. Both $\phi_{opt}$ and $V_{opt}$ depend on the transmission equipment specification.

According to this invention, optimization of selection of the slicing level V and sampling phase $\phi$ is effected based on the raw error rate $BER_{raw}$, which is the error rate measured for the recovered data before any error correction. This $BER_{raw}$ can be determined using any error detection codes or methods. Then, the signal recovered using $\phi_{opt}$ and $V_{opt}$ may be subjected to a further error correcting method, such as FEC. A single-error correcting error correction circuit improves the BER by:

$$P_{err}(\text{corrected})=C \cdot P_{err}(\text{raw})^2$$

where C is a constant, depending upon the data block size. Provided the raw BER is kept low enough, the corrected error rate can be reduced to essentially negligible values.

Figure 2:
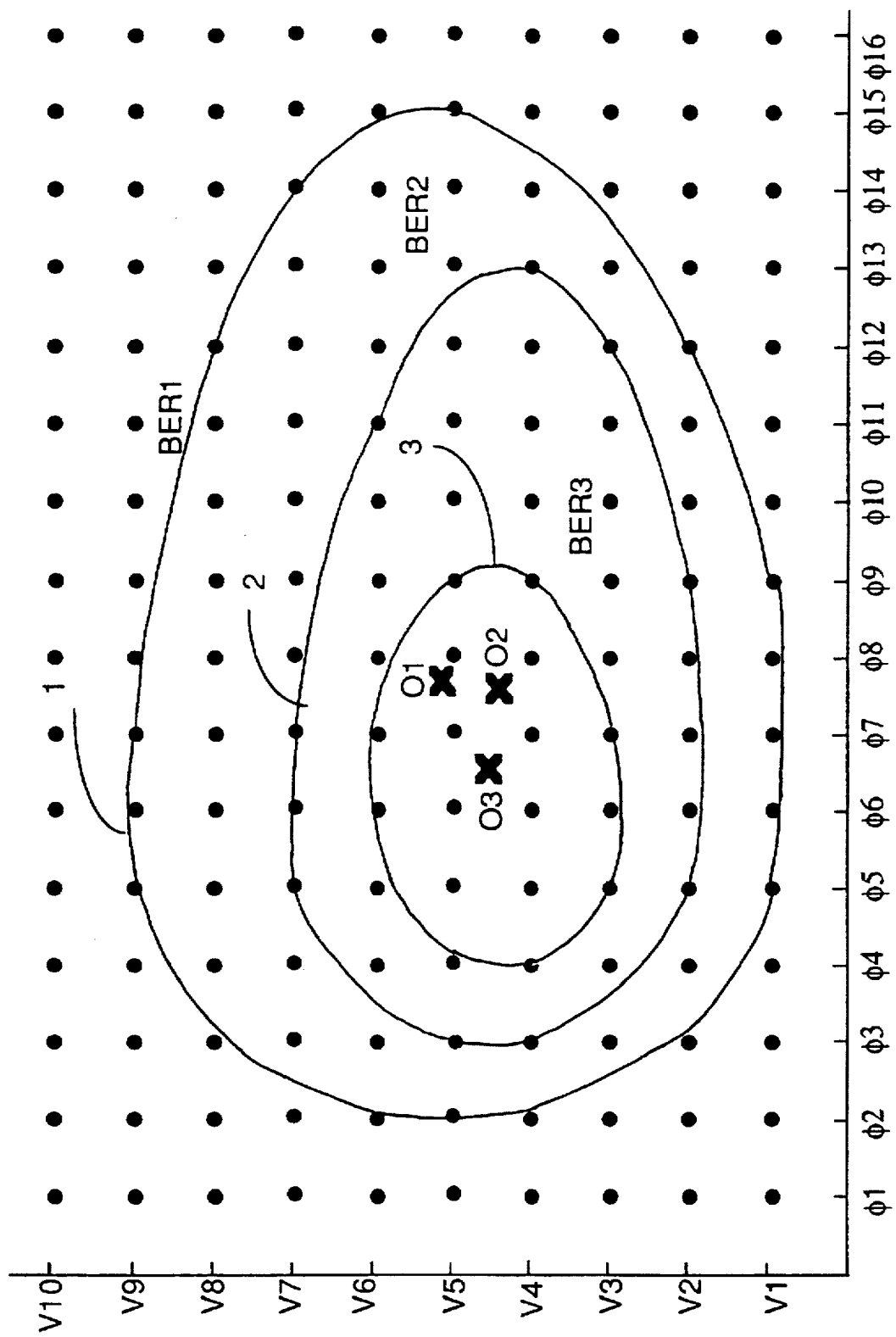
FIG. 2 is an eye closure diagram with BER contour maps.

FIG. 2 shows three raw error rate contours BER1, BER2 and BER3, mapped onto a measured eye closure diagram. A contour for a given error rate is obtained by varying the sampling phase $\phi$ and then adjusting the slicing level V until the given BER is measured. Contour 3 corresponds to a lower error rate, for example $10^{-12}$, while contour 2 corresponds to a higher BER, for example $10^{-9}$, and contour 1 to a BER of $10^{-6}$. From these contours, logic on the receiver selects the optimum operating conditions for maintaining the raw error as low as possible. To this end, after mapping, the logic determines the centroid of the space defined by a contour corresponding to the acceptable error rate $BER_{prov}$ for the respective data regenerator, and selects those coordinates as the optimum for the operating point of the data regenerator. The optimum point O1 on FIG. 2 corresponds to the optimum for contour 1 (BER1), point O2 corresponds to the optimum for contour 2 (BER2); and point O3 corresponds to the optimum for contour 3 (BER1).

In order to minimize the time required to perform an error rate contour, and to minimize the potential for creating errors of a higher order than can be corrected, several steps can be taken in the design of the data regenerator. Thus, rather than sampling long enough to determine the true raw error rate at a given point, the regenerator can sample long enough to determine that the error rate is below some threshold. For example, if during a sampling time of 1 second, no errors are detected at the data rate of 10 Gb/s, a 95% confidence factor that the error rate is below $4e^{-10}$ can be assumed.

In addition, contours should be prepared only for raw error rates below an acceptable threshold, for example $10^{-6}$.

Figure 3:
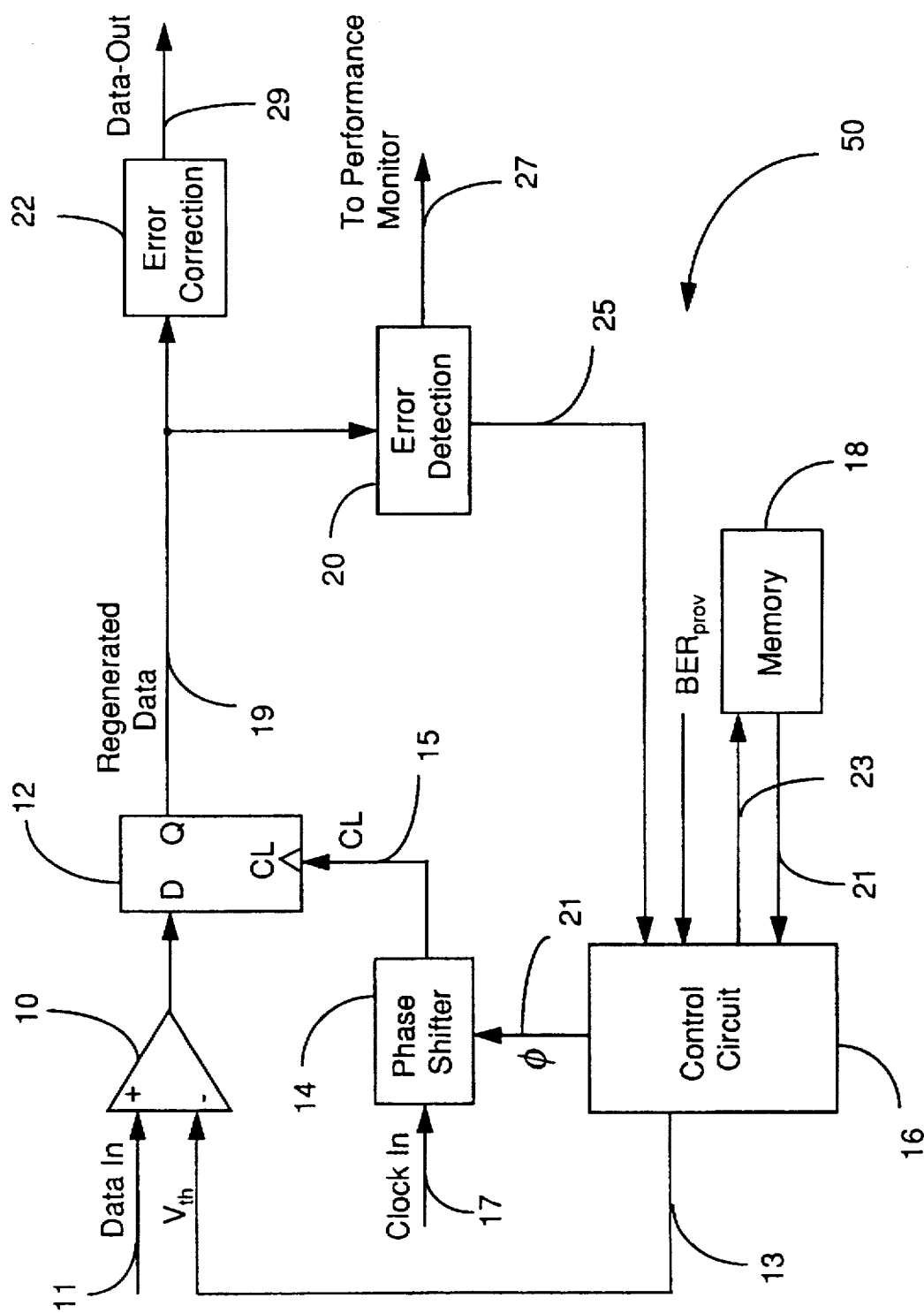
FIG. 3 is a block diagram of a data regenerator with forward error correction according to the invention.

Referring now to FIG. 3, a data regenerator 50 according to the invention comprises a comparator 10, which is an analog to digital converter. The non-inverting terminal (+) of comparator 10 receives the data-in signal on line 11, and the inverting terminal (−) receives the slicing level $V_{th}$ on line 13. Slicing level $V_{th}$ is generated by control circuit 16. Regenerator 50 translates all inputs that are higher than $V_{th}$, as logic "1", and all inputs that are lower than $V_{th}$, as logic "0". As discussed above, selection of an optimal value for $V_{th}$ is important for reducing the error rate of the regenerator. Thus, if $V_{th}$ is close to the $V_-$ level shown in FIG. 1, some of the "0"s of the data-in signal will be erroneously interpreted as "1"s, or, if $V_{th}$ is close to the $V_+$ level shown in FIG. 1, some of the incoming "1"s will be erroneously interpreted as "0"s.

The digital signal output by comparator 10 is applied to the input D of a flip-flop 12, to obtain the regenerated data signal 19. The duration of each regenerated pulse is determined by the sampling pulse applied on the CL pin of flip-flop 12. As indicated above, the sampling pulse should be optimally positioned inside the data eye, to reduce the errors in the recovered data due to noise and different delays experienced by the pulses travelling along the transmission path (jitter). Therefore, to obtain the sampling point at an optimum position $\phi_{opt}$ as shown in FIG. 1, flip-flop 12 is clocked with a variant of the recovered clock 17, which variant is obtained by adjusting the phase of the recovered clock using a phase shifter 14. Phase shifter 14 displaces the clock pulses according to the phase signal $\phi$ received from control circuit 16 on line 21.

Control circuit 16 determines the optimum values $V_{opt}$ and $\phi_{opt}$ for $V_{th}$ and $\phi$, using the BER contours stored and updated at regular intervals of time in memory 18.

An error detection circuit 20 receives the regenerated data signal 19 and counts the number of the errors. A raw error count signal output by error detection circuit 22 is applied to control circuit 16 on line 25 for determination of the operation point.

Data regenerator 50 is also provided with an error correction unit 22, which corrects errors detected in the regenerated data signal received on line 19, to provide the corrected data-out signal on output 29. The particular embodiment of error detection unit 20 and error correction unit 22 are not relevant to this invention. For example, the error rate can be determined by FEC-type circuitry or from any other error detection codes, as is the section and line parity information in a SONET frame.

The control circuit 16 operates in an error mapping mode, an optimization mode, or a data regeneration mode. In the error mapping mode, the control circuit 16 generates sets of threshold and phase values using any suitable method, and receives the resulting raw BER from the error detection circuit 20. For example, control circuit 16 varies the threshold $V_{th}$ applied to comparator 10 in increments from $V_1$ to $V_{10}$ as shown in the example illustrated in FIG. 2. In the meantime, control circuit 16 varies the phase $\phi$ of the signal applied on the CL input of flip-flop 12 in increments from $\phi_1$ to $\phi_{16}$. The BER is measured for each pair $(V_i, \phi_j)$ and stored in memory 18. In order to minimize the time spent at high raw error rate conditions, the mapping of the received eye is only being done on a periodic basis, once a day or at start-up.

In the optimization mode of operation, control circuit 16 finds the centroid of the space delimited by a contour defined by a BER lower than a predetermined BER. For example, operating point O2 is the centroid of contour 2. This operation point is considered by the data regenerator 50 as an optimum and used for obtaining a raw BER less than BER2. The optimum voltage threshold $V_{opt}$ and the optimum phase $\phi_{opt}$ are then transmitted to comparator 10 and phase shifter 14, respectively, for data regeneration.

In the data regeneration mode of operation, data-in signal 11 is processed using $V_{opt}$ and $\phi_{opt}$ to obtain regenerated data on line 19. In addition, a $BER_{prov}$ value may be provided by the user for further optimization of the data recovery process. Thus, the regenerator selects a new operation point if the control circuit 16 detects that the raw BER exceeds $BER_{prov}$ using a search algorithm of nearest neighbours. In this way, the operation of the data regenerator is not interrupted for new eye contour mapping.

Figure 4A:
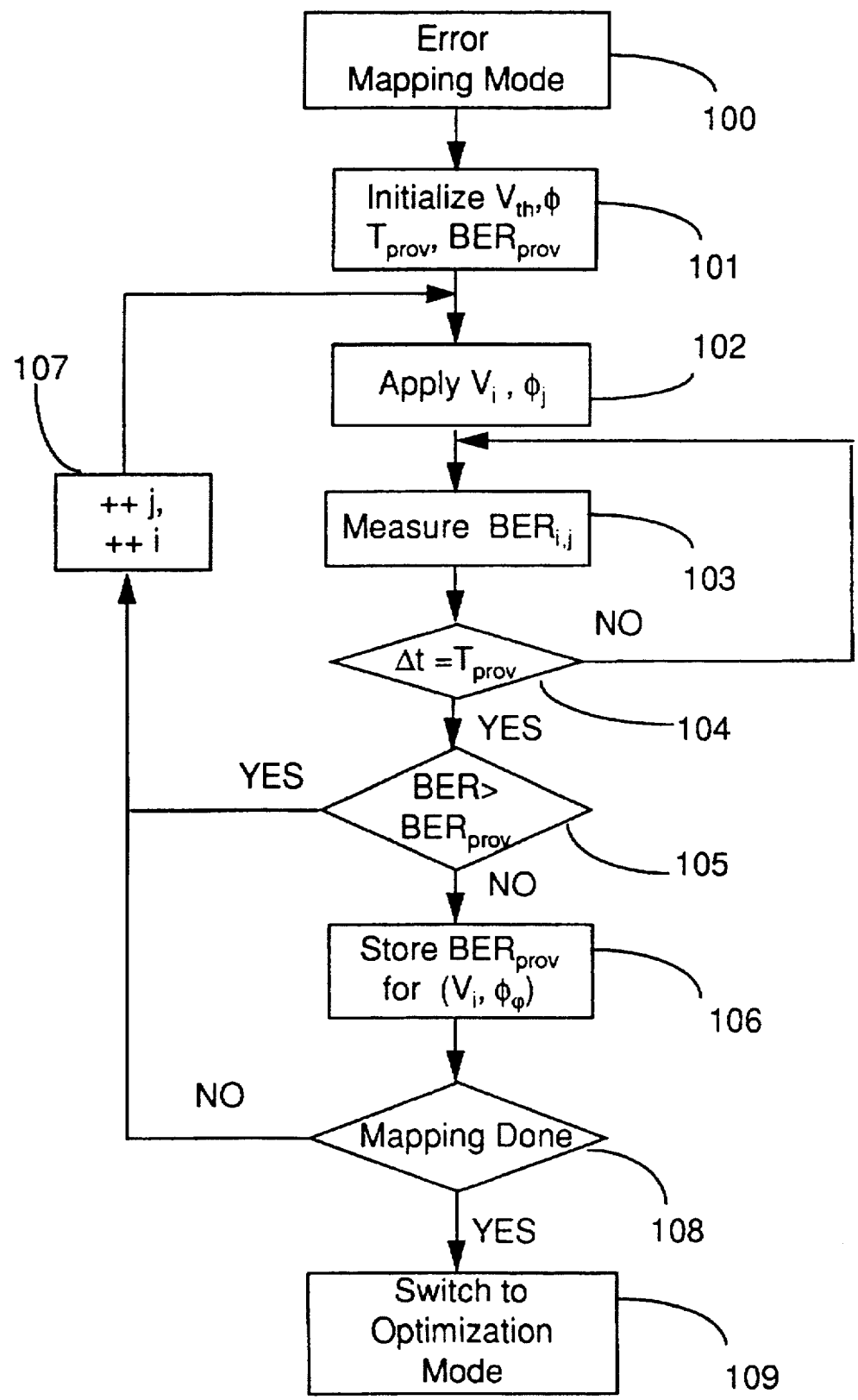
FIG. 4A is a flow chart of the error mapping mode of operation.

FIG. 4A is a flow chart of the operation of the control circuit in the error mapping mode. After control circuit 16 assumes the error mapping mode of operation, as shown in step 100, the threshold $V_{th}$ and the phase $\phi$ are initialized for BER contour mapping in step 101. $T_{prov}$ defines the sampling time for measuring the current raw BER. Alternatively, rather than measuring the true current $BER_{raw}$, a shorter time interval $T_{prov}$ may be set for limiting the collection time for each pair $(V_i, \phi_j)$. $T_{prov}$ should be selected long enough to obtain a raw BER which is below the maximum admissible error rate $BER_{prov}$. Steps 102 to 108 illustrate the mapping process, wherein the slicing level $V_i$ takes (I) successive values, and the phase $\phi_j$ takes (J) successive values. In the example shown in FIG. 2, I=10 and J=16. All pairs $(V_i, \phi_j)$ are applied to the comparator 10 and flip-flop 12, respectively, in step 102, and the current raw BER is measured in step 103 for the time interval $T_{prov}$, as illustrated in step 104.

The flow chart of FIG. 4A illustrates the case discussed above when only the pairs $(V_i, \phi_j)$ giving error rates lower than $BER_{prov}$ are retained, as illustrated in step 105. The selected pairs $(V_i, \phi_j)$ and the current raw BER are then stored in step 106 in memory 18. Next, in step 108, the control circuit 16 determines if the mapping is done, namely if the BER values have been measured for all selected pairs $(V_i, \phi_j)$. If not, the operation is repeated for the next pair $(V_i, \phi_j)$, as shown in step 107. It is to be noted that the mapping operation may be performed by maintaining "i" constant for "j" varying between 1 and J, the operation being repeated for all i's, or it may be performed by maintaining "j" constant for "i" varying between 1 and I, the operation being repeated for all j's.

After the error rate for all pairs ($V_i, \phi_j$) has been measured and stored, control circuit 16 switches to the optimization mode in step 109.

Figure 4B:
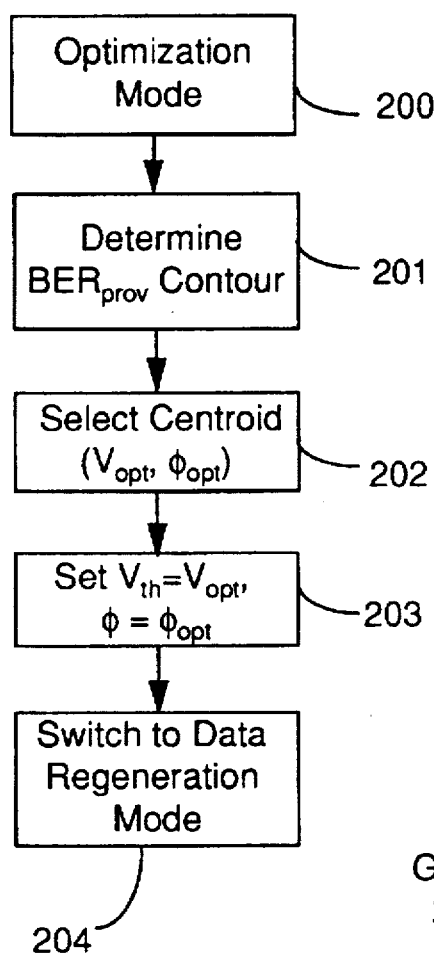
FIG. 4B is a flow chart of the optimization mode of operation.

FIG. 4B illustrates the mode of operation of data regenerator 50 when control circuit 16 operates in the optimization mode, step 200. The control circuit 16 selects a BER contour of interest in step 201 by selecting on the BER map only the pairs ($V_i, \phi_j$) corresponding to $BER_{prov}$. The centroid of this contour for the provisioned BER is determined in step 202 using any suitable method for determining the centroid of an irregular contour. Such a method may be implemented in software or in firmware in control circuit 16. After the coordinates of the centroid are determined, the slicing level $V_{th}$ assumes the value $V_{opt}$ and the sampling phase $\phi$ assumes the value $\phi_{opt}$, values which are applied to comparator 10 and phase shifter 14, respectively, as shown in step 203. The control circuit then switches to the data regeneration mode of operation in step 204.

Figure 4C:
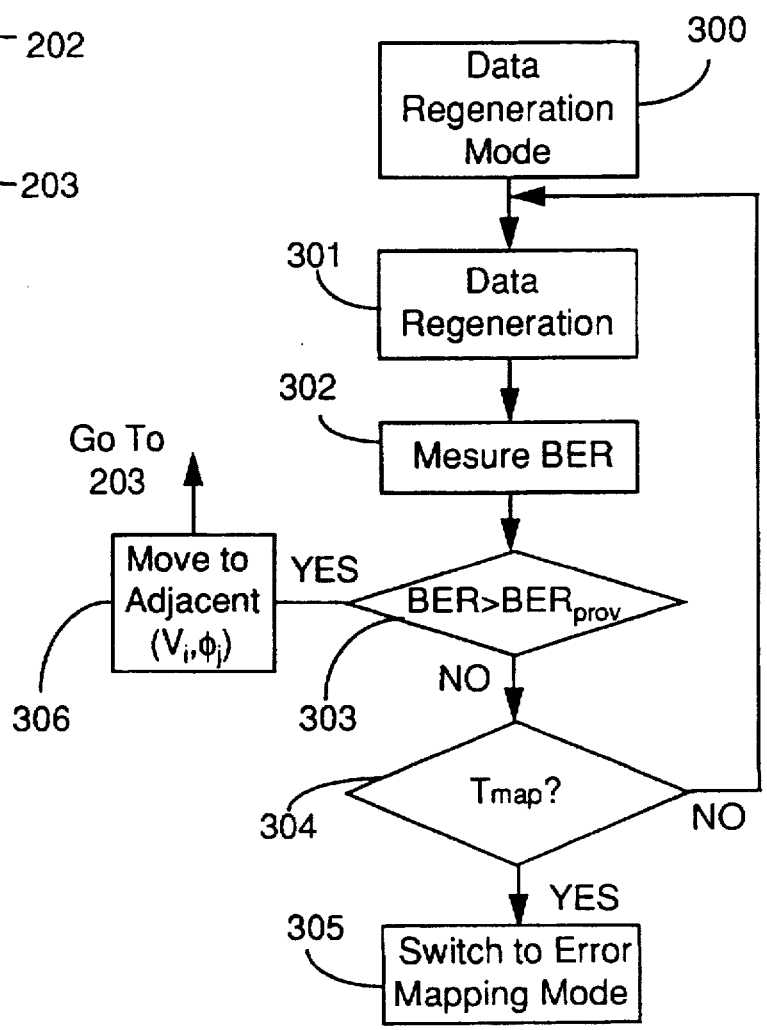
FIG. 4C is a flow chart of the data recovery mode of operation.

A flow chart for the data regeneration mode of operation is illustrated in FIG. 4C. Data is regenerated during step 301 as explained above in connection with FIG. 3. The current BER is continuously measured for each data frame, or the like, as shown in step 302, using the slicing level $V_{opt}$ and phase $\phi_{opt}$ for the optimal operating point. Error correction is also available, using error correction circuit 22. If control circuit 16 detects that the current raw error rate exceeds the provisioned error $BER_{prov}$ as shown in step 303, a search algorithm of nearest neighbours is used in step 306 to find a new operational point, without updating the contours.

If the current BER measured in step 302 is less than the provisioned $BER_{prov}$, steps 301 to 303 are repeated.

Information from the error mapping mode (i.e. eye opening at a given BER) can be used to optimize other parameters of the transmission system to improve the quality of the transmitted signal and hence reduce the BER. Examples are APD bias, equalizer settings, transmission power, bias, etc.

Intersite communication can be used to ensure that no two receivers perform an eye contour map at the same time. Using the above techniques with a daily eye contour mapping and a threshold error rate of $10^{-10}$, the average corrected error rate has been calculated to be approximately as low as $10^{-24}$.

While the invention has been described with reference to particular example embodiments, further modifications and improvements which will occur to those skilled in the art, may be made within the purview of the appended claims, without departing from the scope of the invention in its broader aspect.

What is claimed is:

1. A method for recovering an outgoing data signal from an incoming signal received over a transmission network, comprising the steps of:

preparing a bit error rate (BER) map for a data regenerator;

determining, on said BER map, an optimal operation point for a provisioned $BER_{prov}$ value; and monitoring said data regenerator to function in said optimal operation point for providing a regenerated data signal.

2. A method as claimed in claim 1, further comprising the step of correcting the errors in said regenerated data signal for obtaining said outgoing data signal.

3. A method as claimed in claim 2, wherein said step of correcting comprises applying said regenerated data to a forward error correction circuit.

4. A method as claimed in claim 1, wherein the step of preparing a BER map comprises:

(a) switching said data regenerator to operate in an error mapping mode;

(b) recovering a clock signal from said incoming signal;

(c) selecting a phase $\phi_j$ and phase-shifting said clock signal to obtain a phase shifted clock signal $CL_j$;

(d) selecting a slicing level $V_i$;

(e) decoding said incoming signal using said slicing level $V_i$ and said phase shifted clock signal $CL_j$;

(f) measuring a $BER_{i,j}$ over a preset period of time $T_{prov}$ and storing said $BER_{i,j}$, said slicing level $V_i$, and said phase $\phi_j$ in a memory;

(g) repeating steps (d) to (f) for a plurality (I) of slicing levels $V_i$; and (h) repeating steps (c) to (g) for a plurality (j) of phases $\phi_j$.

5. A method as claimed in claim 1, wherein the step of preparing a BER map comprises:

(a) switching said data regenerator to operate in an error mapping mode;

(b) recovering a clock signal from said incoming signal;

(c) selecting a slicing level $V_i$;

(d) selecting a phase $\phi_j$ and phase-shifting said clock signal to obtain a phase shifted clock signal $CL_j$;

(e) decoding said incoming signal using said slicing level $V_i$ and said phase shifted clock signal $CL_j$;

(f) measuring a $BER_{ij}$ over a preset period of time $T_{prov}$ and storing said $BER_{i,j}$, said slicing level $V_i$, and said phase $\phi_j$ in a memory;

(g) repeating steps (d) to (f) for a plurality (j) of phases $\phi_j$; and (h) repeating steps (c) to (g) for a plurality (I) of slicing levels $V_i$.

6. A method as claimed in claim 1, wherein said step of determining an optimal operation point comprises:

switching said data regenerator to operate in an optimization mode;

determining on said BER map a contour including all coordinates having the BER values equal to said provisioned $BER_{prov}$;

calculating the centroid of said contour and determinig the coordinates ($V_O, \phi_O$) of the centroid; and determining an optimal slicing level $V_{opt}$ and an optimal phase $\phi_{opt}$ corresponding to the respective coordinates ($V_O, \phi_O$) of said centroid.

7. A method as claimed in claim 6, wherein said step of monitoring comprises:

switching said data regenerator from said optimization mode to operate in a data regeneration mode;

phase shifting said clock signal with said phase $\phi_j$ to obtain an optimal clock signal $CL_{opt}$; and recovering said outgoing data signal using said optimal slicing level $V_{opt}$ and said optimal clock signal $CL_{opt}$.

8. A method as claimed in claim 5, wherein said step (f) includes limiting said period of time $T_{prov}$ to a value for which said $BER_{i,j}$ is less than said provisioned $BER_{prov}$.

9. A method as claimed in claim 7, further comprising:

measuring the current BER of said outgoing data signal;

comparing said current BER with said provisioned $BER_{prov}$;

selecting a new operating point for said data regenerator on said BER map whenever said current BER is greater than said provisioned BER.

10. A method as claimed in claim 9, wherein said step of selecting a new operating point comprises:

searching for a nearest neighbour point to said optimal operating point and determinig the coordinates of said nearest neighbour point;

determining a further slicing level $V_{opt}$ and a further phase $\phi_{opt}$; and operating said data regenerator according to said step of monitoring.

11. A method as claimed in claim 1, wherein the step of preparing a BER map comprises:

(a) switching said data regenerator to operate in an error mapping mode;

(b) recovering a clock signal from said incoming signal;

(c) selecting a phase $\phi_j$ and phase-shifting said clock signal to obtain a phase shifted clock signal $CL_j$;

(d) selecting a slicing level $V_i$;

(e) decoding said incoming signal using said slicing level $V_i$ and said phase shifted clock signal $CL_j$;

(f) measuring a $BER_{i,j}$ over a preset period of time $T_{prov}$ and storing said $BER_{i,j}$, said slicing level $V_i$, and said phase $\phi_j$ in a memory whenever said BER is less than a provisioned $BER_{prov}$;

(g) repeating steps (d) to (f) for a plurality (I) of slicing levels $V_i$;

(h) repeating steps (c) to (g) for a plurality (j) of phases $\phi_j$; and (i) correcting the errors in said regenerated data signal for obtaining said outgoing data signal.

12. A data regenerator for recovering an outgoing data signal from an incoming signal received over a transmission network, comprising:

a comparator for receiving said incoming signal and a slicing level and providing a digital signal;

a phase shifter for shifting a regenerated clock signal with a phase signal to obtain a phase shifted clock signal;

a latch for receiving said digital signal and said phase shifted clock signal to provide a regenerated data signal;

an error detector means for determining a raw bit error rate (BER) of said regenerated data signal;

a control circuit for generating said slicing level and said phase signal; and a memory for storing a map of the bit error rate from the error detector means.

13. A data regenerator as claimed in claim 12, further comprising an error correction circuit for receiving said regenerated data and providing said corrected outgoing data signal.

14. A data regenerator as claimed in claim 13, wherein said error correction circuit is a forward error correction circuit.

15. A data regenerator as claimed in claim 12, wherein said control circuit comprises:

means for preparing a BER map for said data regenerator;

means for determining, on said BER map, an optimal operation point for a provisioned $BER_{prov}$ value; and means for switching the mode of operation of said data regenerator between an error mapping mode, an optimization mode and a data regeneration mode, according to a mapping time alarm.

16. A smart receiver comprising a data regenerator according to claim 12.

* * * * *